(12) United States Patent
Zukawa et al.

(10) Patent No.: US 8,755,327 B2
(45) Date of Patent: Jun. 17, 2014

(54) RADIO BASE STATION, MOBILE COMMUNICATION SYSTEM AND MOBILE COMMUNICATION METHOD FOR CONTROLLING A TRANSMISSION POWER OF A REFERENCE CHANNEL AND AN ASSOCIATED CHANNEL

(75) Inventors: Hiroki Zukawa, Yokohama (JP); Hidehiko Oyane, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 243 days.

(21) Appl. No.: 13/378,508

(22) PCT Filed: Jun. 15, 2010

(86) PCT No.: PCT/JP2010/060103
§ 371 (c)(1),
(2), (4) Date: Mar. 8, 2012

(87) PCT Pub. No.: WO2010/147110
PCT Pub. Date: Dec. 23, 2010

(65) Prior Publication Data
US 2012/0155409 A1    Jun. 21, 2012

(30) Foreign Application Priority Data

Jun. 15, 2009  (JP) .................................. 2009-142412

(51) Int. Cl.
*H04B 7/185* (2006.01)
*H04W 52/36* (2009.01)
*H04W 52/32* (2009.01)
*H04W 52/16* (2009.01)

(52) U.S. Cl.
CPC .............. *H04W 52/16* (2013.01); *H04W 52/36* (2013.01); *H04W 52/32* (2013.01)
USPC ........................... 370/318; 370/329; 455/13.4

(58) Field of Classification Search
USPC ............... 370/252, 318–341; 455/13.4, 127.1
See application file for complete search history.

(56) References Cited

U.S. PATENT DOCUMENTS

| 6,173,162 | B1 | 1/2001 | Dahlman et al. |
| 6,816,476 | B2* | 11/2004 | Kim et al. ...................... 370/342 |
| 7,627,336 | B2* | 12/2009 | Carlsson et al. .............. 455/522 |
| 2007/0207828 | A1* | 9/2007 | Cheng et al. .................. 455/522 |

FOREIGN PATENT DOCUMENTS

| JP | 2002 503427 | 1/2002 |
| JP | 2005 130503 | 5/2005 |
| JP | 2007 329758 | 12/2007 |

OTHER PUBLICATIONS

International Search Report Issued Jul. 20, 2010 in PCT/JP10/060103 Filed Jun. 15, 2010.

* cited by examiner

*Primary Examiner* — Kan Yuen
(74) *Attorney, Agent, or Firm* — Oblon, Spivak, McClelland, Maier & Neustadt, L.L.P.

(57) ABSTRACT

A radio base station 10 according to the present invention includes a reference channel power setting unit 11 configured to change a transmission power of a reference channel, an associated channel power setting unit 12 configured to set a relative power offset of an associated channel by using a value relative to the reference channel, a power parameter holding unit 13 configured to hold power parameters set by the reference channel power setting unit 11 and associated channel power setting unit 12, a power parameter adjustment unit configured to adjust the relative power offset of the associated channel in a case where the transmission power of the reference channel is changed,
and a transmitter 15 configured to transmit a signal of each channel on the basis of information in the power parameter holding unit 15, wherein the power parameter adjustment unit 14 maintains the transmission power of the associated channel unchanged even though the transmission power of the reference channel is changed.

11 Claims, 5 Drawing Sheets

(a)

| TRANSMISSION POWER OF PCPICH | X[dBm] | Y[dBm] |
|---|---|---|
| OFFSET OF UPPER-LIMIT TRANSMISSION POWER | -a[dB] | X-Y-a[dB] |
| UPPER-LIMIT TRANSMISSION POWER OF DEDICATED CHANNEL | X-a[dBm] | X-a[dBm] |

(b)

| TRANSMISSION POWER OF PCPICH | X[dBm] | Y[dBm] |
|---|---|---|
| OFFSET OF UPPER-LIMIT TRANSMISSION POWER | -b[dB] | X-Y-b[dB] |
| LOWER-LIMIT TRANSMISSION POWER OF DEDICATED CHANNEL | X-b[dBm] | X-b[dBm] |

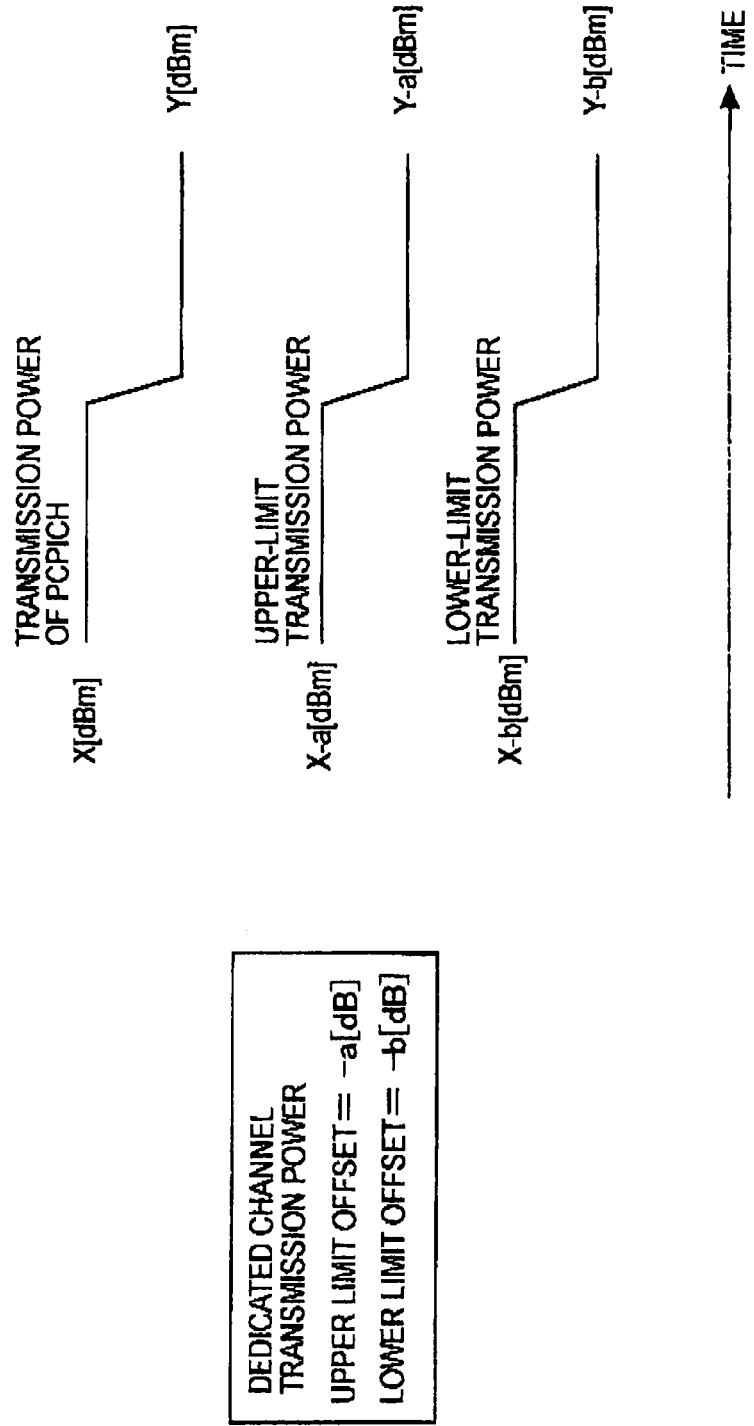

_RADIO BASE STATION, MOBILE
COMMUNICATION SYSTEM AND MOBILE
COMMUNICATION METHOD FOR
CONTROLLING A TRANSMISSION POWER
OF A REFERENCE CHANNEL AND AN
ASSOCIATED CHANNEL_

TECHNICAL FIELD

The present invention relates to a radio base station, a mobile communication system and a mobile communication method.

BACKGROUND ART

Mobile communication systems using the W-CDMA system employ a configuration in which a transmission power of each channel other than PCPICH (Primary Common Pilot Channel) is set by using a value relative to a transmission power of PCPICH.

Here, a dedicated channel is configured to have an upper limit of the transmission power (hereinafter, "upper-limit transmission power") and a lower limit of the transmission power (hereinafter, "lower-limit transmission power") each set by using a value relative to the transmission power of PCPICH, and to transmit a dedicated channel with a transmission power within a range between the upper-limit transmission power and the lower-limit transmission power.

In such a mobile communication system, as shown in no. 5, when the transmission power of PCPICH is "X (dBm)", and offset values of the upper-limit transmission power and the lower-limit transmission power are "−a (dB)" and "−b (dB)", respectively, and an offset value of a transmission power of a certain common channel is "−c (dB)", for example, the upper-limit transmission power of the dedicated channel is "X−a (dBm)", the lower-limit transmission power of the dedicated channel is "X−b (dBm)", and the transmission power of the common channel is "X−c (dBm)".

Accordingly, when the transmission power of PCPICH is changed from "X (dBm)" to "Y (dBm)", the upper-limit transmission power of the dedicated channel, the lower-limit transmission power of the dedicated channel and the transmission power of the common channel are automatically changed from "X−a (dBm)", "X−b (dBm)" and "X−c (dBm)" to "Y−a (dBm)", "Y−b (dBm)" and "Y−c (dBm)", respectively.

PRIOR ART DOCUMENT

Patent Document

Patent Document 1: Japanese Patent Application Publication No. 2007-329758

SUMMARY OF THE INVENTION

Hereinafter, a "reference channel" denotes a channel serving as the reference for setting the transmission power ("PCPICH" in the case of the W-CDMA system), and an "associated channel" denotes a channel ("dedicated channel" and "common channel" in the case of the W-CDMA system) having the upper-limit transmission power and the lower-limit transmission power set by using values relative to the transmission power of the reference channel.

Moreover, a "relative power offset" denotes each of the transmission power, the upper-limit transmission power and the lower-limit transmission power of the associated channel which is set by using a value relative to the transmission power of the reference channel.

The aforementioned operation described in BACKGROUND ART is effective in order to maintain the transmission power ratio of the "reference channel" to the "associated channel" after the transmission power of the reference channel is changed.

However, there is a problem that the transmission power of the associated channel is changed together with a change in the transmission power of the reference channel even though it is desired to change only the transmission power of the reference channel and not to change the transmission power of the associated channel.

As a specific example, for a dedicated channel of the W-CDMA system, since a decrease in the transmission power of the reference channel (PCPICH) is accompanied by a decrease in the upper-limit transmission power of the associated channel (dedicated channel), there arises a concern of quality degradation of the associated channel, and thereby leading to disconnection or the like of a call established with the associated channel.

In this respect, the present invention has been made in view of the aforementioned problems, and an objective of the present invention is to provide a radio base station, a mobile communication system and a mobile communication method which are capable of appropriately transmitting a signal by maintaining the transmission power, the upper-limit transmission power and the lower-limit transmission power of the associated channel even though the transmission power of the reference channel is changed.

The first feature of the present invention is summarized as a radio base station including: a reference channel power setting unit configured to set a transmission power of a reference channel in a predetermined cell; an associated channel power setting unit configured to set a relative power offset of an associated channel by using a value relative to the reference channel; a power parameter holding unit configured to hold, as power parameters, the transmission power of the reference channel set by the reference channel power setting unit and the relative power offset of the associated channel set by the associated channel power setting unit; and a power parameter adjustment unit configured to adjust the relative power offset of the associated channel in a case where the transmission power of the reference channel is changed, wherein the power parameter adjustment unit maintains the transmission power of the associated channel unchanged even though the transmission power of the reference channel is changed.

The second feature of the present invention is summarized as a radio base station including: a reference channel power setting unit configured to set a transmission power of a reference channel in a predetermined cell; an associated channel power setting unit configured to set a relative power offset of an associated channel by using a value relative to the reference channel; a power parameter holding unit configured to hold, as power parameters, the transmission power of the reference channel set by the reference channel power setting unit and the relative power offset of the associated channel set by the associated channel power setting unit; and a power parameter adjustment unit configured to adjust the relative power offset of the associated channel in a case where the transmission power of the reference channel is changed, wherein the power parameter adjustment unit maintains upper and lower limits of the transmission power of the associated channel unchanged even though the transmission power of the reference channel is changed.

The third feature of the present invention is summarized as a mobile communication system including the radio base station according to any one of the first and second features of the present invention.

The fourth feature of the present invention is summarized as a mobile communication method including the steps of: changing a transmission power of a reference channel by a radio base station; setting a transmission power of an associated channel by the radio base station by using a relative power offset set using a value relative to the reference channel; and maintaining the transmission power and upper and lower limits of the transmission power of the associated channel unchanged by the radio base station even though the transmission power of the reference channel is changed.

BRIEF DESCRIPTION OF DRAWINGS

FIG. 5 is a diagram showing an example of upper and lower limits of a transmission power of a dedicated channel transmitted by a conventional radio base station.

MODES FOR CARRYING OUT THE INVENTION

Configuration of Mobile Communication system According to First Embodiment of the Present Invention A description will be given of a configuration of a mobile communication system according to a first embodiment of the present invention with reference to FIG. 1 to FIG. 4.

Figure 1:
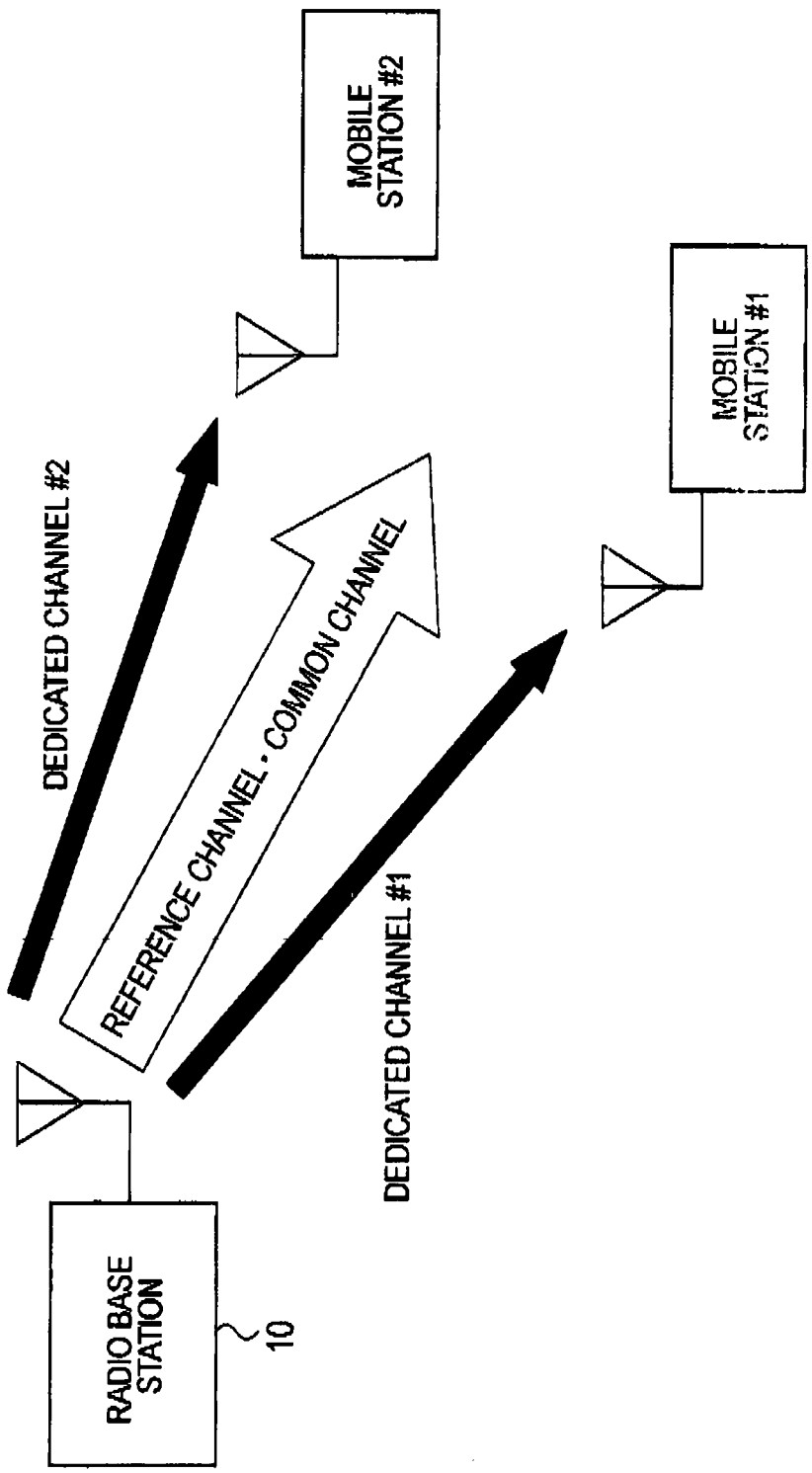
FIG. 1 is an overall configuration diagram of a mobile communication system according to a first embodiment of the present invention.

As shown in FIG. 1, the mobile communication system according to the first embodiment includes a radio base station 10 and mobile stations UE #1 and UE #2. Note that, the mobile communication system according to the present embodiment may be a mobile communication system using the W-CDMA system, LTE (Long Term Evolution) system or other communication systems.

Figure 2:
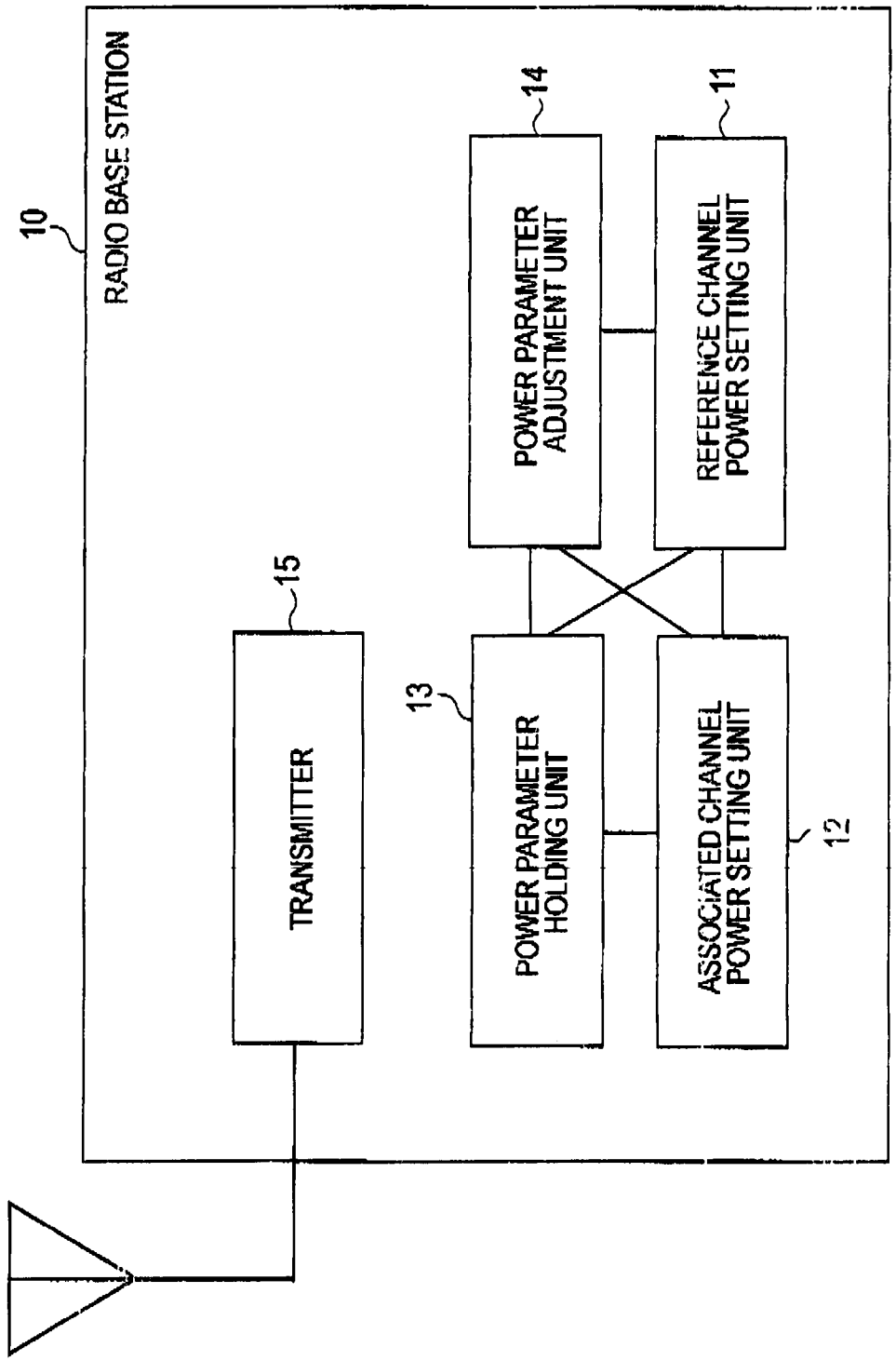
FIG. 2 is a functional block diagram of a radio base station according to the first embodiment of the present invention.
Figure 3:
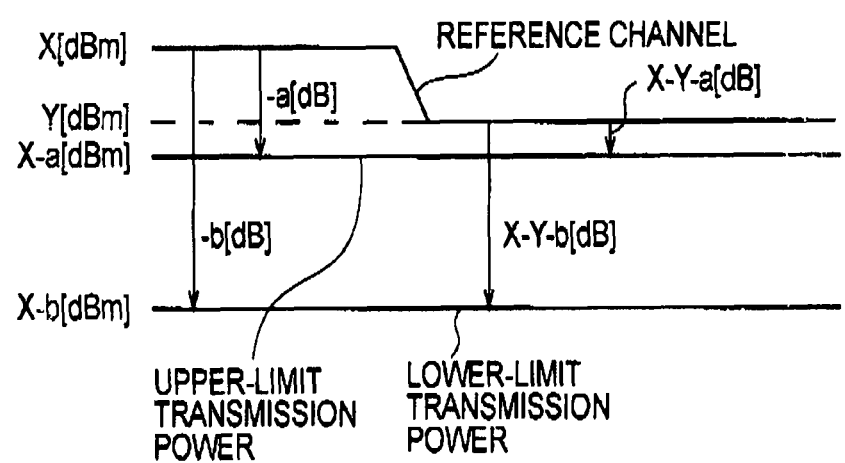
FIG. 3 is a diagram showing an example of upper and lower limits of a transmission power of a dedicated channel transmitted by the radio base station according to the first embodiment of the present invention.

As shown in FIG. 2, the radio base station 10 includes a reference channel power setting unit 11, an associated channel power setting unit 12, a power parameter holding unit 13, a power parameter adjustment unit 14 and a transmitter 15.

The reference channel power setting unit 11 is configured to set the transmission power of the reference channel.

The associated channel power setting unit 12 is configured to set each relative power offset of an associated channel by using a value relative to the transmission power of the reference channel set by the reference channel power setting unit 11.

The power parameter holding unit 13 is configured to hold power parameters of each channel (transmission power of the reference channel or relative power offsets of the associated channel) set by the reference channel power setting unit 11 or the associated channel power setting unit 12.

The power parameter adjustment unit 14 is configured to change the relative power offsets (the transmission power, the upper-limit transmission power and the lower-limit transmission power of an associated channel) of an associated channel in a case where the transmission power of the reference channel is changed.

The transmitter 15 is configured to transmit a signal of each channel on the basis of the values in the power parameter holding unit 13.

To put it more specifically, the power parameter adjustment unit 14 may be configured to maintain the transmission power, the upper-limit transmission power and the lower-limit transmission power of an associated channel unchanged even though the transmission power of the reference channel is changed.

For a case where the reference channel is PCPICH and the associated channel is a dedicated channel as shown in FIGS. 3(a) to 3(c), the power parameter holding unit 13 may be configured to determine an upper-limit relative power "X−a (dBm)" of the dedicated channel and a lower-limit relative power "X−b (dBm)" of the dedicated channel on the basis of a transmission power "X (dBm)" of PCPICH and relative power offsets (the offset of the upper-limit transmission power and the offset of lower-limit transmission power) "−a (dB)" and "−b (dB)" of the dedicated channel.

The power parameter adjustment unit 14 may be configured to change the relative power offsets of the associated channel and to maintain the transmission power of the associated channel in a case where the transmission power of the reference channel is changed, thereafter.

As shown in FIGS. 3(a) to 3(c), the power parameter adjustment unit 14 may maintain the upper-limit transmission power "X−a (dBm)" of the dedicated channel and the lower-limit transmission power "X−b (dBm)" of the dedicated channel even though the transmission power of PCPICH is changed to "Y (dBm)", for example.

Here, the relative power offset for the upper-limit transmission power "X−a (dBm)" with respect to the transmission power "Y (dBm)" of PCPICH is "X−Y−a (dB)", and the relative power offset for the lower-limit transmission power "X−b (dBm)" with respect to the transmission power "Y (dBm)" of PCPICH is "X−Y−b (dB)".

Figure 4:
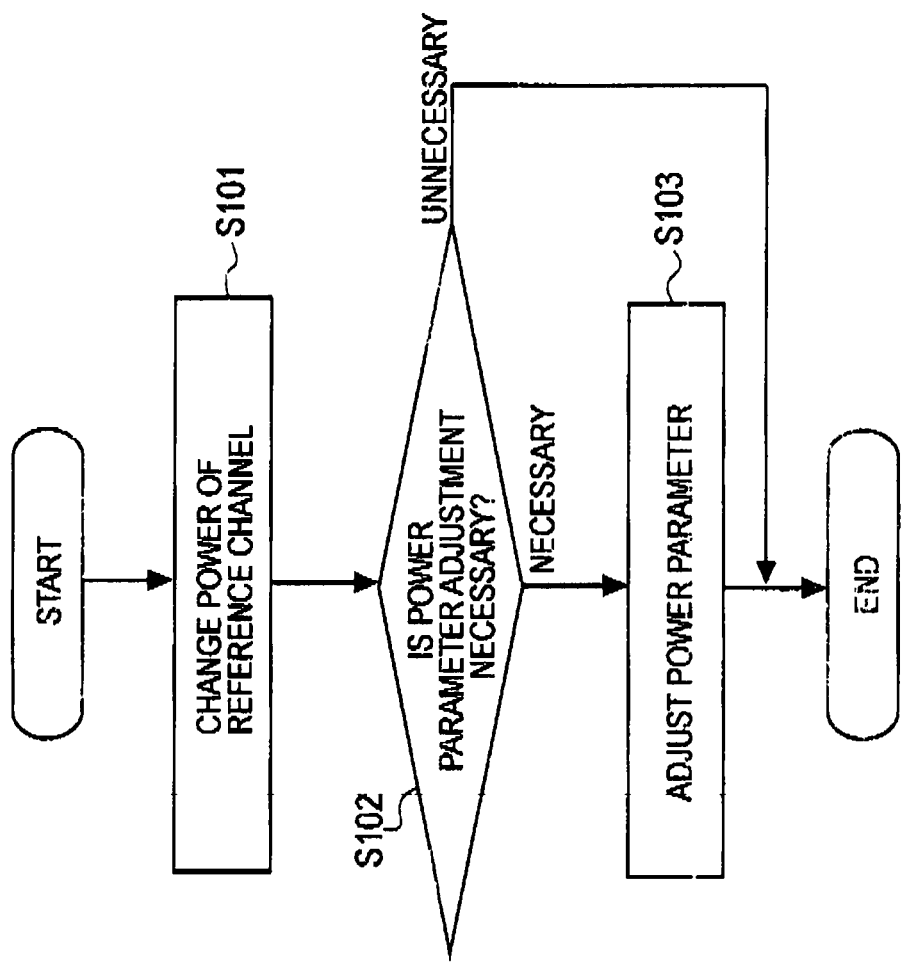
FIG. 4 is a flowchart showing an operation of the mobile communication system according to the first embodiment of the present invention.

Operation of Mobile Communication System According to First Embodiment of the Present Invention Hereinafter, a description will be given of an operation of the mobile communication system according to the present embodiment with reference to FIG. 4.

In a case where the transmission power of a reference channel is changed while the reference channel and an associated channel are already set, the transmission power of the reference channel is changed from "X (dBm)" to "Y (dBm)" in step S101.

In step S102, whether or not power parameter adjustment is necessary for each associated channel is determined. If it is determined that the adjustment is necessary, the processing proceeds to step S103. If it is determined that the adjustment is unnecessary, the processing ends. In this case, no change is made in the relative power offsets, so that the transmission power of the associated channel changes in conjunction with the transmission power of the reference channel.

In step S103, the power parameter is adjusted so as to prevent the transmission power of the associated channel from changing between before and after the transmission power of the reference channel is changed.

Assume that the transmission power of the reference channel is changed from "X (dBm)" to "Y (dBm)", and the relative power offset of the associated channel before the transmission power of the reference channel is changed is "−a (dB)", for example. In this case, the transmission power of the associated channel before the transmission power of the reference channel is changed is "X−a (dBm)".

Here, in a case where the transmission power of the reference channel is changed to "Y (dBm)", the transmission power of the associated channel becomes "Y−a (dBm)" if the power parameter is not adjusted. Thus, the relative power offset is changed from "−a (dB)" to "X−Y−a (dB)" in order to maintain the transmission power of the associated channel equals to "X−a (dBm)".

Operational Effects of Mobile Communication System According to First Embodiment of the Present Invention The mobile communication system according to the first embodiment of the present invention is configured in such a way that the transmission power of an associated channel is not changed even though the transmission power of the reference channel is changed. Thus, it is possible to solve the problem that the transmission power of a dedicated channel for a mobile station in communication via the channel decreases, and the communication is thus disconnected when the transmission power of the reference channel decreases, for example.

The characteristic features of the present embodiment described above may be expressed in the following manner.

A first aspect of the present embodiment is summarized as the radio base station 10 including: the reference channel power setting unit 11 configured to set a transmission power of a reference channel (PCPICH, for example) in a predetermined cell; the associated channel power setting unit 12 configured to set a relative power offset of an associated channel (dedicated channel, for example) by using a value relative to the reference channel; the power parameter holding unit 13 configured to hold, as power parameters, the transmission per of the reference channel set by the reference channel power setting unit 11; and the relative power offset of the associated channel set by the associated channel power setting unit 12, and the power parameter adjustment unit 14 configured to adjust the relative power offset of the associated channel in a case where the transmission power of the reference channel is changed, wherein the power parameter adjustment unit 14 maintains the transmission power of the associated channel unchanged even though the transmission power of the reference, channel is changed.

A second aspect of the present embodiment is summarized as the radio base station 10 including: the reference channel power setting unit 11 configured to set a transmission power of a reference channel in a predetermined cell; the associated channel power setting unit 12 configured to set a relative power offset of an associated channel by using a value relative to the reference channel; the power parameter holding unit 13 configured to hold, as power parameters, the transmission power of the reference channel set by the reference channel power setting unit 11 and the relative power offset of the associated channel set by the associated channel power setting unit 12; and the power parameter adjustment unit 14 configured to adjust the relative power offset of the associated channel in a case where the transmission power of the reference channel is changed, wherein the power parameter adjustment unit 14 maintains upper and lower limits of the transmission power of the associated channel unchanged even though the transmission power of the reference channel is changed.

In any one of the first or second aspects of the present embodiment, a request from an upper node may be used as a trigger to change the transmission power of the reference channel.

In any one of the first or second aspects of the present embodiment, the power parameter adjustment unit 14 may select whether or not to adjust the power parameter in accordance with a condition where the transmission power of the reference channel is changed or a type of the associated channel.

A third aspect of the present embodiment is summarized as a mobile communication system including the radio base station according to any one of the first and second aspects.

A fourth aspect of the present embodiment is summarized as a mobile communication method including the steps of: changing a transmission power of a reference channel by the radio base station 10, setting a transmission power of an associated channel by the radio base station 10 by using a relative power offset set using a value relative to the reference channel, and maintaining the transmission power and upper and lower limits of the transmission power of the associated channel unchanged by the radio base station 10 even though the transmission power of the reference channel is changed.

In the fourth aspect of the present embodiment, a request from an upper node may be used as a trigger to change the transmission power of the reference channel.

Note that the above described operations of the radio base station 10 and the mobile station UE may be implemented by hardware, may be implemented by a software module executed by a processor, or may be implemented by a combination of both.

The software module may be provided in any type of storage medium such as a RAM (Random Access Memory), a flash memory, a ROM (Read Only Memory), an EPROM (Erasable Programmable ROM) an EEPROM (Electronically Erasable and Programmable ROM), a register, a hard disk drive, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base station 10 and the mobile station UE. Also, the storage medium and the processor may be provided in the radio base station 10 and the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the scope of the present invention defined by the description of the scope of claims. Thus, what is described herein is for illustrative purpose, and has no intention whatsoever to limit the present invention.

Note that the entire content of Japanese Patent Application No. 2009-142412 (filed on Jun. 15, 2009) is incorporated herein by reference.

INDUSTRIAL APPLICABILITY

According to the present invention, it is made possible to appropriately transmit a signal by maintaining the transmission power, the upper-limit transmission power and the lower-limit transmission power of an associated channel even though the transmission power of the reference channel is changed. Thus, the present invention is useful in mobile communications and the like.

EXPLANATION OF REFERENCE NUMERALS

10 RADIO BASE STATION
11 REFERENCE CHANNEL POWER SETTING UNIT
12 ASSOCIATED CHANNEL POWER SETTING UNIT
13 POWER PARAMETER HOLDING UNIT
14 POWER PARAMETER ADJUSTMENT UNIT
15 TRANSMITTER

The invention claimed is:

1. A radio base station comprising:
a reference channel power setting unit configured to set a transmission power of a reference channel in a predetermined cell;
an associated channel power setting unit configured to set a relative power offset of an associated channel by using a value relative to the reference channel;
a power parameter holding unit configured to hold/store, as power parameters, the transmission power of the reference channel set by the reference channel power setting unit and the relative power offset of the associated channel set by the associated channel power setting unit; and
a power parameter adjustment unit configured to adjust the relative power offset of the associated channel in a case where the transmission power of the reference channel is changed, wherein
the power parameter adjustment unit maintains the transmission power of the associated channel unchanged even though the transmission power of the reference channel is changed.

2. A radio base station comprising:
a reference channel power setting unit configured to set a transmission power of a reference channel in a predetermined cell;
an associated channel power setting unit configured to set a relative power offset of an associated channel by using a value relative to the reference channel;
a power parameter holding unit configured to hold/store, as power parameters, the transmission power of the reference channel set by the reference channel power setting unit and the relative power offset of the associated channel set by the associated channel power setting unit; and
a power parameter adjustment unit configured to adjust the relative power offset of the associated channel in a case where the transmission power of the reference channel is changed, wherein
the power parameter adjustment unit maintains upper and lower limits of the transmission power of the associated channel unchanged even though the transmission power of the reference channel is changed.

3. The radio base station according to claim 1 or 2, wherein a request from an upper node is used as a trigger to change the transmission power of the reference channel.

4. The radio base station according to claim 1 or 2, wherein the power parameter adjustment unit selects whether or not to adjust the power parameter in accordance with a condition where the transmission power of the reference channel is changed or a type of the associated channel.

5. A mobile communication system comprising the radio base station according to claim 1 or 2.

6. The radio base station according to claim 3, wherein the power parameter adjustment unit selects whether or not to adjust the power parameter in accordance with a condition where the transmission power of the reference channel is changed or a type of the associated channel.

7. A mobile communication system comprising the radio base station according to claim 6.

8. A mobile communication system comprising the radio base station according to claim 3.

9. A mobile communication system comprising the radio base station according to claim 4.

10. A mobile communication method comprising the steps of:
changing a transmission power of a reference channel by a radio base station;
setting a transmission power of an associated channel by the radio base station by using a relative power offset set using a value relative to the reference channel; and
maintaining the transmission power and upper and lower limits of the transmission power of the associated channel unchanged by the radio base station even though the transmission power of the reference channel is changed.

11. The mobile communication method according to claim 10, wherein a request from an upper node is used as a trigger to change the transmission power of the reference channel.

* * * * *